US011985457B2

(12) United States Patent
Hatano et al.

(10) Patent No.: US 11,985,457 B2
(45) Date of Patent: May 14, 2024

(54) COMMUNICATION APPARATUS AND COMMUNICATION METHOD

(71) Applicant: NIPPON TELEGRAPH AND TELEPHONE CORPORATION, Tokyo (JP)

(72) Inventors: Tomoya Hatano, Musashino (JP); Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 171 days.

(21) Appl. No.: 17/631,145

(22) PCT Filed: Aug. 2, 2019

(86) PCT No.: PCT/JP2019/030510
§ 371 (c)(1),
(2) Date: Jan. 28, 2022

(87) PCT Pub. No.: WO2021/024306
PCT Pub. Date: Feb. 11, 2021

(65) Prior Publication Data
US 2022/0272428 A1 Aug. 25, 2022

(51) Int. Cl.
*H04Q 11/00* (2006.01)
(52) U.S. Cl.
CPC . *H04Q 11/0067* (2013.01); *H04Q 2011/0037* (2013.01); *H04Q 2011/0069* (2013.01); *H04Q 2011/0073* (2013.01); *H04Q 2011/0086* (2013.01)

(58) Field of Classification Search
None
See application file for complete search history.

(56) References Cited

U.S. PATENT DOCUMENTS

| 5,559,623 | A | * | 9/1996 | Einarsson | H04B 10/85 |
| | | | | | 398/40 |
| 6,870,836 | B1 | * | 3/2005 | Dyke | H04Q 11/0067 |
| | | | | | 370/461 |
| 6,915,429 | B1 | * | 7/2005 | Allen | H04L 63/0823 |
| | | | | | 398/166 |
| 7,792,425 | B2 | * | 9/2010 | Aronson | H04B 10/40 |
| | | | | | 398/30 |
| 8,428,063 | B2 | * | 4/2013 | Salinger | H04L 69/08 |
| | | | | | 709/224 |

(Continued)

OTHER PUBLICATIONS

Prasanna, Sweetha, Cryptography just for beginners, 2015 (Year: 2015).*
Medhi, Von Neumann Architecture, 2012 (Year: 2012).*

*Primary Examiner* — Jai M Lee
(74) *Attorney, Agent, or Firm* — Harness, Dickey & Pierce, P.L.C.

(57) ABSTRACT

A communication device in a communication system in which functions that are converted to software are configured as a plurality of components, and the functions are realized as a result of the components being respectively executed by a plurality of communication devices that are connected to a network, the communication device including a capsulation function unit configured to encapsulate information that is to be transmitted to another communication device.

7 Claims, 4 Drawing Sheets

(56) References Cited

U.S. PATENT DOCUMENTS

| | | | |
|---|---|---|---|
| 8,428,457 B2* | 4/2013 | Mizutani | H04Q 11/0067 |
| | | | 398/43 |
| 8,819,423 B2* | 8/2014 | Ekkizogloy | G06F 21/10 |
| | | | 713/168 |
| 8,824,504 B2* | 9/2014 | Zou | H04J 14/0283 |
| | | | 370/395.51 |
| 9,379,877 B2* | 6/2016 | Mizutani | H04J 3/1694 |
| 9,510,061 B2* | 11/2016 | Bonta | H04L 65/65 |
| 2003/0219015 A1* | 11/2003 | Constant Six | H04L 12/5601 |
| | | | 370/389 |
| 2011/0142448 A1* | 6/2011 | Zou | H04J 14/0201 |
| | | | 398/58 |
| 2011/0305458 A1* | 12/2011 | Zhou | H04J 3/1605 |
| | | | 398/66 |
| 2015/0156014 A1* | 6/2015 | Shaffer | H04L 63/061 |
| | | | 380/256 |
| 2018/0026715 A1* | 1/2018 | Zhao | H04B 10/27 |
| | | | 398/1 |
| 2022/0182466 A1* | 6/2022 | Hatano | H04L 41/34 |

* cited by examiner

COMMUNICATION APPARATUS AND COMMUNICATION METHOD

CROSS-REFERENCE TO RELATED APPLICATIONS

This application is a 371 U.S. National Phase of International Application No. PCT/JP2019/030510 filed on Aug. 2, 2019. The entire disclosure of the above application is incorporated herein by reference.

TECHNICAL FIELD

The present invention relates to a communication device and a communication method.

BACKGROUND ART

Examples of communication systems that include communication devices include a PON (Passive Optical Network) system. The PON system includes an optical subscriber line terminal device (ONU: Optical Network Unit) that is installed in a house of a customer, for example, an optical subscriber line terminal station device (OLT: Optical Line Terminal) that is a communication device installed in a station building, and an optical distribution network (ODN). In some cases, the ODN connects a plurality of ONUs and a plurality of OLTs.

If a function of a communication device that is not largely dependent on at least any of standards to which the device conforms, the generation, scheme, system, device type, and manufacturing vendor of the device is configured as a component, and at least a portion of an input/output interface (IF) such as an application programming interface (API) of the function is clarified to increase versatility, portability, and extendibility, it is possible to easily share the function between devices that differ from each other in at least any of standards to which the devices conform, generation, scheme, system, device type, and manufacturing vendor, and it is possible to easily add a unique function (see NPL 1, for example).

CITATION LIST

Non Patent Literature

[NPL 1] "Welcome to FASA Home Page", [online], NTT Access Network Service Systems Laboratories, [searched on Jul. 10, 2019], Internet <URL:http://www.ansl.ntt.co.jp/j/FASA/index.html>

SUMMARY OF THE INVENTION

Technical Problem

When configuring functions of an OLT, which is a communication device, as components, the following cases are conceivable: a case where a PON interface unit and a computing unit are physically implemented by a single device, and a case where the PON interface unit and the computing unit are implemented by two or more devices (or platforms) in a distributed manner. In the case where these units are implemented by a single device, a WBS (White Box Switch) is used, for example.

On the other hand, in the case where these units are implemented by two or more devices (or platforms) in a distributed manner, a configuration may be adopted in which the functions are separated between a device that functions as the PON interface unit and a device (e.g., a server) that functions as the computing unit, for example. In this case, a configuration is conceivable in which the device that functions as the PON interface unit takes on a function of communicating with ONUs in accordance with a PON protocol and a function of transferring main signals, and the device (e.g., server) that functions as the computing unit takes on a function of performing processing on control signals and a function of managing overall processing of OLT functions, for example. Note that the control signals referred to here are signals such as "GATE" and "GRANT" in DBA (Dynamic Bandwidth Allocation), signals relating to OMCI (ONU Management and Control Interface) and OAM (Operation Administration and Maintenance), and the like, for example.

If the PON interface unit and the computing unit that constitute the OLT are provided in a plurality of devices (or platforms) in a distributed manner as described above, control signals need to be transmitted and received between these functional units. Also, the plurality of devices including the functional units are sometimes installed at places that are apart from each other. For example, there is a case where functions such as an OAM function for which restrictions regarding time are relatively low are installed at a place that is apart from the PON interface and are integrated into a single device corresponding to a plurality of PON interface units, for the sake of efficiency. As described above, the plurality of devices constituting the OLT are not always installed close to each other and communicably connected directly to each other.

If the plurality of devices including the functional units are installed at places that are apart from each other as described above, communication performed between the plurality of devices may be mixed with communication performed with another external device in a network. This increases a risk of an erroneous connection occurring due to a control signal being sent to a device that is not the destination of the control signal, for example. Therefore, a mechanism for reliably performing communication with a communication target device is needed.

Also, if the plurality of devices including the functional units are installed at places that are apart from each other, there is a case where communication needs to be performed between the plurality of devices via a network of which security is relatively low. In this case, risks of wiretapping, tampering, identity theft, and the like being performed by a malicious user increase, for example. Therefore, a mechanism for safely performing communication is needed.

However, conventional technologies are designed on the assumption that the plurality of devices constituting the OLT are installed close to each other and are communicably connected directly to each other, and accordingly, do not include a mechanism for reliably performing communication with a communication target device, a mechanism for safely performing communication, and the like. Therefore, conventionally, there is a problem in that the plurality of devices cannot be arranged flexibly.

The present invention was made in view of the above circumstances, and has an object of providing a technology that makes it possible to flexibly arrange the plurality of devices.

Means for Solving the Problem

An aspect of the present invention is a communication device in a communication system in which functions that are converted to software are configured as a plurality of components, and the functions are realized as a result of the components being respectively executed by a plurality of communication devices that are connected to a network, the communication device including a capsulation function unit configured to encapsulate information that is to be transmitted to another communication device.

Another aspect of the present invention is a communication method to be executed with a communication system in which functions that are converted to software are configured as a plurality of components, and the functions are realized as a result of the components being respectively executed by a plurality of communication devices that are connected to a network, the communication method comprising encapsulating information that is to be transmitted to another communication device.

Effects of the Invention

According to the present invention, the plurality of devices can be arranged flexibly.

DESCRIPTION OF EMBODIMENTS

Embodiment

The following describes an embodiment of the present invention with reference to the drawings. In the present embodiment described below, a communication system is assumed in which functions of an OLT are configured as a plurality of components, and the components are provided in a distributed manner in a device that functions as a PON interface unit and devices that function as computing units. Note that the device that functions as the PON interface unit is a PON interface 10, which will be described later, for example, and the devices that function as the computing units are a server 20a and a server 20b, which will be described later, for example.

Figure 1:
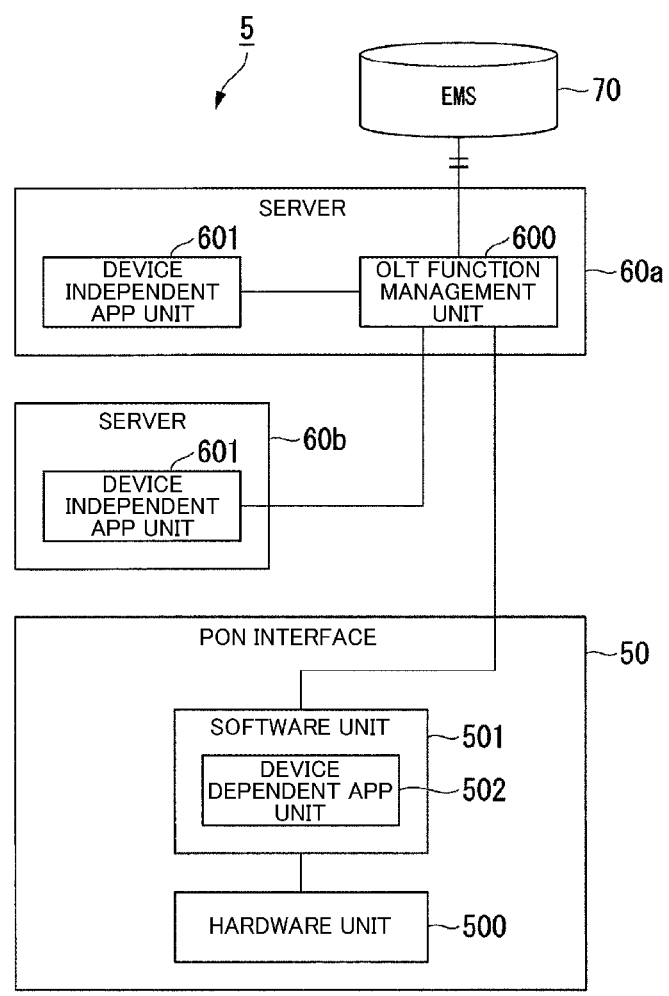
FIG. 1 is a block diagram showing a configuration of a communication system according to a conventional technology.

To facilitate understanding of descriptions of the configuration of a communication system 1 according to the present embodiment, first, the configuration of a communication system 5 according to a conventional technology will be described. FIG. 1 is a block diagram showing the configuration of the communication system 5 according to the conventional technology.

The communication system 5 is a system that communicates with another communication device (e.g., ONU) using signals (e.g., optical signals) transmitted via an optical fiber network such as an ODN in a PON. The communication system 5 functions as an OLT. As shown in FIG. 1, the communication system 1 includes a PON interface 50, a server 60a, a server 60b, and an EMS 70. Note that a configuration is also possible in which the communication system 5 includes another server (not shown).

The PON interface 50, the server 60a, and the server 60b include components that are hardware, software, or a combination of hardware and software, or functions that are configured as components. For example, the PON interface 50, the server 60a, and the server 60b include software components such as applications that realize functions or the like that differ between services or telecommunications carriers, using a general-purpose input/output interface, and fundamental constitutional elements of an access network device that provide the general-purpose input/output interface to the software components and provide functions that need not be changed according to a service or a request because the functions are standardized, for example. An example of the general-purpose input/output interface is a FASA (registered trademark, Flexible Access System Architecture: new access system architecture) application API (see NPL 1). An example of the applications is a FASA (registered trademark) application (see NPL 1). An example of the fundamental constitutional elements of the access network device is a FASA (registered trademark) basis (see NPL 1). Owing to the use of the general-purpose input/output interface, functions can be easily added or replaced, and services can be flexibly and immediately provided for various requests. Note that in the following description, an "application" may be referred to as an "app unit".

As shown in FIG. 1, the PON interface 50 includes a hardware unit 500 that is hardware that executes processing relating to the PON, and a software unit 501 that is software for executing the processing relating to the PON. Also, the software unit 501 includes a device dependent app unit 502.

The device dependent app unit 502 is a functional unit having a configuration that is dependent on the hardware unit 500. That is, the device dependent app unit 502 is a functional unit that is dependent on standards to which the hardware unit 500 conforms or the manufacturing vendor of the device. In other words, the device dependent app unit 502 is a functional unit that is constituted by an application of which compatibility with other hardware is low and that cannot be used as is in newly manufactured hardware (in particular, hardware that conforms to different standards or is manufactured by a different manufacturing vendor). Note that a configuration is also possible in which the software unit 501 further includes a device independent app unit (not shown) that is a functional unit having a configuration that is not dependent on the hardware unit 500.

As shown in FIG. 1, the server 60a includes an OLT function management unit 600 and a device independent app unit 601. Also, the server 60b includes a device independent app unit 601.

The device independent app units 601 are functional units having configurations that are not dependent on the hardware unit 500. That is, the device dependent app units 601 are functional units that are not dependent on standards to which the hardware unit 500 conforms and the manufacturing vendor of the device. In other words, the device dependent app units 601 are functional units that are constituted by applications of which compatibility with other hardware is high and that can be used as is in newly manufactured hardware (in particular, hardware that conforms to different standards or is manufactured by a different manufacturing vendor). Note that specific examples of applications included in the device independent app units 601 include an application for performing setting processing in a network device, an application for performing processing for changing settings, an application for monitoring, managing, or authenticating a network, and an application for performing algorithm processing.

The OLT function management unit 600 unitarily accepts input of control signals that are output from the EMS 70. Based on the control signals output from the EMS 70, the OLT function management unit 600 outputs various instructions and information for checking states or the like to the functional units of the communication system 5. Also, the OLT function management unit 600 performs setting regarding the device independent app units 601, the device dependent app unit 502, and the hardware unit 500, changes or deletes settings, and monitors states of these units.

Note that the EMS (Element Management System) 70 is a system that manages devices (i.e., the PON interface 50, the server 60a, and the server 60b) constituting the network.

The device dependent app unit 502 and the device independent app units 601 are functional units corresponding to functions of the OLT that are configured as components (converted to software). As described above, the device dependent app unit 502 is an application having a configuration that is dependent on the hardware unit 500 included in the PON interface 50. Accordingly, the device dependent app unit 502 needs to be included in the software unit 501 of the PON interface 50.

The device independent app units 601 include basic functions such as a DBA function and an OAM function of the OLT, for example. Also, the device independent app units 601 include an optional function and an edge computing function of the OLT, for example. Note that a configuration is also possible in which the device independent app units 601 are included in the PON interface 50.

As described above, in the communication system 5, functions of the OLT are configured as components, and the components are installed in the PON interface 50 and the servers (the servers 60a and 60b) in a distributed manner. Therefore, in order for the communication system 5 to function as the OLT, processing signals need to be transmitted and received between the functional units described above. As shown in FIG. 1, communication performed between the OLT function management unit 600 of the server 60a and the device independent app unit 601 of the server 60b and communication performed between the OLT function management unit 600 of the server 60a and the software unit 501 of the PON interface 50 are performed between functional units that are provided in different devices.

However, particularly in a case where the devices are physically spaced apart from each other, there is a high possibility of communication performed with another device being mixed with the above communication in the network, and a risk of an erroneous connection or the like arises, for example. Also, in this case, there is a high possibility of communication being performed via a network that is not secure, and risks of wiretapping, tampering, and the like arise, for example. Therefore, in such a communication system, it has been conventionally difficult to arrange the plurality of devices in a distributed manner at places that are apart from each other, and arrangement of the devices has been restricted. In contrast, the communication system 1 according to the present embodiment described below can solve the above problem.

Configuration of Communication System

The following describes a functional configuration of the communication system 1.

Figure 2:
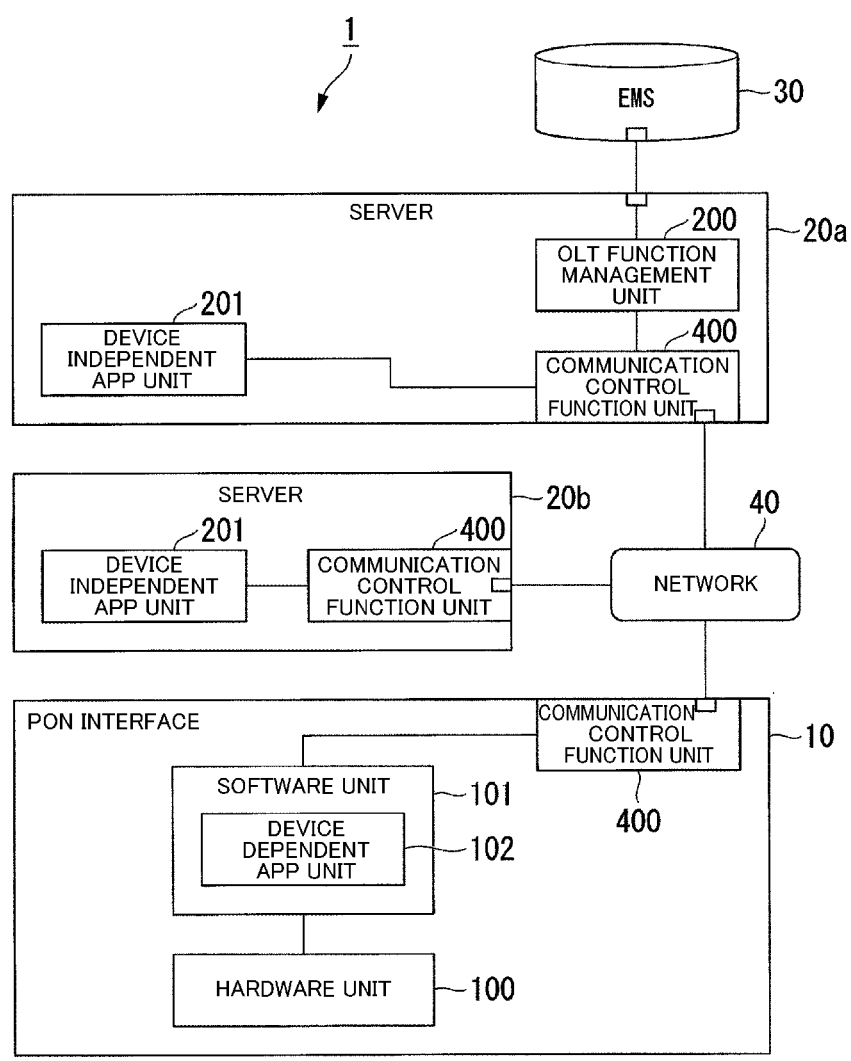
FIG. 2 is a block diagram showing a functional configuration of a communication system according to an embodiment of the present invention.

FIG. 2 is a block diagram showing the functional configuration of the communication system 1 according to an embodiment of the present invention. As shown in FIG. 2, the communication system 1 includes a PON interface 10, a server 20a, a server 20b, an EMS 30, and a network 40. Note that a configuration is also possible in which the communication system 1 includes another server (not shown).

As shown in FIG. 2, the PON interface 10 includes a hardware unit 100 that is hardware that executes processing relating to the PON, a software unit 101 that is software for executing the processing relating to the PON, and a communication control function unit 400. Also, the software unit 101 includes a device dependent app unit 102 that is a functional unit having a configuration that is dependent on the hardware unit 100. Note that a configuration is also possible in which the software unit 101 further includes a device independent app unit that is a functional unit having a configuration that is not dependent on the hardware unit 100.

As shown in FIG. 2, the server 20a includes an OLT function management unit 200, a device independent app unit 201, and a communication control function unit 400. Also, the server 20b includes a device independent app unit 201 and a communication control function unit 400.

The OLT function management unit 200 unitarily accepts input of control signals that are output from the EMS 30. Based on the control signals output from the EMS 30, the OLT function management unit 200 outputs various instructions and information for checking states or the like to the functional units of the communication system 1. Also, the OLT function management unit 200 performs setting regarding the device independent app units 201, the device dependent app unit 102, and the hardware unit 100, changes or deletes settings, and monitors states of these units.

The device dependent app unit 102 and the device independent app units 201 are functional units corresponding to functions of the OLT that are configured as components (converted to software). As described above, the device dependent app unit 102 is an application having a configuration that is dependent on the hardware unit 100 included in the PON interface 10. Accordingly, the device dependent app unit 102 needs to be included in the software unit 101 of the PON interface 10.

The device independent app units 201 include basic functions such as the DBA function and the OAM function of the OLT, for example. Also, the device independent app units 201 include an optional function and an edge computing function of the OLT, for example. Note that a configuration is also possible in which the device independent app units 201 are also included in the PON interface 10.

As described above, in the communication system 1, functions of the OLT are configured as components, and the components are installed in the PON interface 10 and the servers (the servers 20a and 20b) in a distributed manner. Therefore, in order for the communication system 1 to function as the OLT, processing signals need to be transmitted and received between the functional units described above. As shown in FIG. 2, communication performed between the OLT function management unit 200 of the server 20a and the device independent app unit 201 of the server 20b and communication performed between the OLT function management unit 200 of the server 20a and the software unit 101 of the PON interface 10 are performed between functional units that are provided in different devices.

As shown in FIG. 2, the PON interface 10, the server 20a, and the server 20b are communicably connected to each other via the network 40. Note that the network 40 may include a section of which security is relatively low. Also, as shown in FIG. 2, the PON interface 10, the server 20*a*, and the server 20*b* each include the communication control function unit 400 and are each communicably connected to the network 40 via the communication control function unit 400.

Functional Configuration of Communication Control Function Unit

The following describes a functional configuration of the communication control function unit 400.

Figure 3:
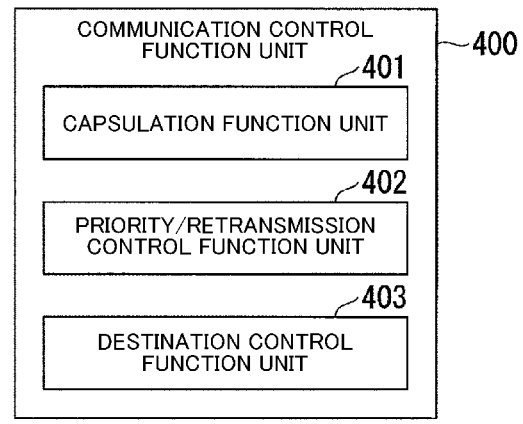
FIG. 3 is a block diagram showing a functional configuration of a communication control function unit according to an embodiment of the present invention.

FIG. 3 is a block diagram showing the functional configuration of the communication control function unit 400 according to an embodiment of the present invention. As shown in FIG. 3, the communication control function unit 400 includes a capsulation function unit 401, a priority/retransmission control function unit 402, and a destination control function unit 403.

The capsulation function unit 401 encapsulates signal information that is to be transferred, into a packet or a frame that can be transferred via the network 40. The encapsulated signal information is sent to a destination device via the network 40 in accordance with a transfer protocol (e.g., IP (Internet Protocol), Ethernet (registered trademark), or ATM (Asynchronous Transfer Mode)) used in the network 40.

At this time, if a tunneling technology such as VLAN (Virtual Local Area Network: virtual LAN) or VPN (Virtual Private Network) can be used in the network 40, the capsulation function unit 401 performs processing such as tagging and labeling relating to the tunneling technology on the signal information. Thus, each device can safely and reliably transfer the signal information via the network 40 to another device. Note that if the tunneling technology cannot be used in the network 40, the capsulation function unit 401 may encapsulate the signal information into a secure packet using IPSec (IP Security Architecture) or SSL (Secure Socket Layer), for example.

Note that a configuration is also possible in which the communication control function unit 400 further includes, for example, an encryption function unit (not shown) other than the capsulation function unit 401. The encryption function unit (not shown) referred to here is a functional unit that encrypts a processing signal using an encryption key that is shared between a transmitter side and a receiver side.

Note that a configuration is also possible in which the communication control function unit 400 further includes a corresponding device authentication function unit (not shown), for example. The corresponding device authentication function unit (not shown) referred to here is a functional unit that confirms normality of a destination device and normality of a communication path before communication is performed. Note that the normality may be confirmed periodically, when starting SSL or VPN, or at the time of reconnection, for example. For example, the normality can be confirmed using a method in which each device is authenticated by a reliable device or a reliable functional component, and the normality is confirmed based on the authentication.

The priority/retransmission control function unit 402 performs control to keep signal information from being disposed of, by controlling the degree of priority when transferring the signal information. Alternatively, when signal information is disposed of, the priority/retransmission control function unit 402 performs processing for requesting a device that transmitted the signal information to retransmit the signal information. Thus, the priority/retransmission control function unit 402 can keep each functional unit from being affected by disposal of the signal information.

Note that the influence of disposal of signal information in the layer 2 or the layer 3 is commonly absorbed as a result of priority control and retransmission control being performed in the layer 4 or an upper layer. Thus, influence on various types of processing performed in the communication system is prevented. However, in the present embodiment, these functions (i.e., functions for performing priority control and retransmission control in the layer 4 or an upper layer) are not included in signal processing performed in each device. Therefore, the communication control function unit 400 according to the present embodiment needs to be provided with the priority/retransmission control function unit 402 described above.

The destination control function unit 403 has a function of performing control such that signal information is reliably transmitted to a server (the server 20*a* or the server 20*b*) or the PON interface 10, which is the destination. For example, the destination control function unit 403 establishes a VPN for each destination of signal information using a P2P (Peer to Peer) method. Thus, the destination control function unit 403 can perform control such that the signal information is reliably sent to the desired destination.

Alternatively, a configuration is also possible in which the destination control function unit 403 has a function of only receiving signal information of which the destination is the device that includes the destination control function unit. In this case, the destination control function unit 403 can realize the above function by, upon receiving signal information, disposing of the signal information if the destination of the signal information is not the device including the destination control function unit, for example.

Note that in conventional common communication technologies, signal information is sent to a destination device using a routing function of the network in both of the layer 2 and the layer 3. Alternatively, in conventional common communication technologies, signal information is sent to a destination device by being multicast and being disposed of by devices that received the signal information but are not the destination of the signal information. However, in the present embodiment, these functions (i.e., a routing function, a multicasting function, etc.) are not included in signal processing performed in each device. Therefore, the communication control function unit 400 according to the present embodiment needs to be provided with the destination control function unit 403 described above.

Operations of Communication Control Function Unit

The following describes an example of operations of the communication control function unit 400.

Figure 4:
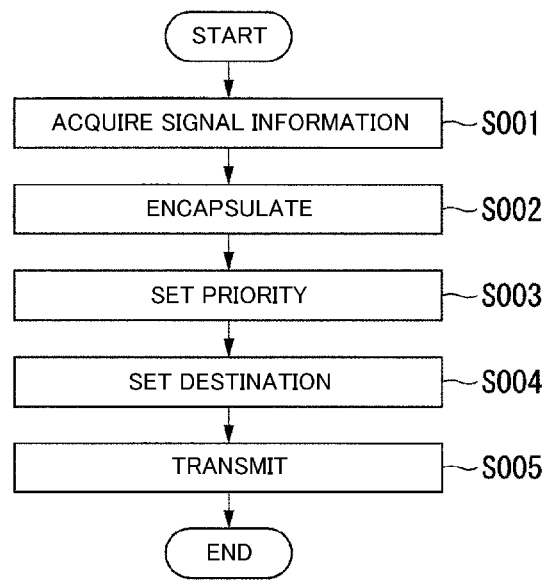
FIG. 4 is a flowchart showing operations of the communication control function unit according to an embodiment of the present invention.
Figure 5:
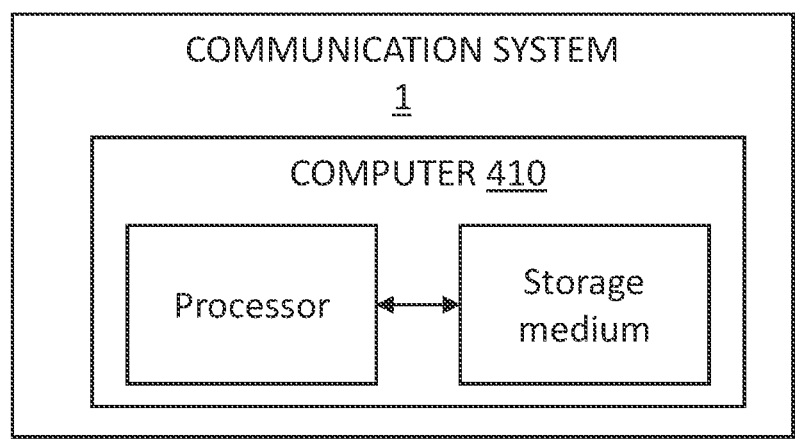
FIG. 5 is a block diagram showing the communication system of FIG. 1 having a computer according to the present disclosure.

FIG. 4 is a flowchart showing operations of the communication control function unit 400 according to an embodiment of the present invention.

The communication control function unit 400 acquires signal information that is to be transmitted to another device from another functional unit (e.g., the software unit 101 or the device independent app unit 201) included in the device that includes the communication control function unit (step S001). The capsulation function unit 401 encapsulates the acquired signal information (step S002). The priority/retransmission control function unit 402 sets a degree of priority of transmission for the signal information (step S003).

The destination control function unit 403 sets a destination such that the signal information will be transmitted to the other device that is the destination of the signal information (step S004). The communication control function unit 400 transmits the signal information via the network 40 to the other device that is the destination (step S005). Through the above, the operations of the communication control function unit 400 shown in the flowchart of FIG. 4 end.

Note that a configuration is also possible in which the communication system 1 executes only some of the processing performed in steps S002 to S004 described above. For example, a configuration is also possible in which the communication system 1 only executes the capsulation processing in step S002 and omits the processing for setting the degree of priority in step S003 and the processing for setting the destination in step S004.

As described above, in the communication system 1 according to an embodiment of the present invention, functions constituting the OLT are constituted by the plurality of devices, and the communication control function unit 400 for safely and reliably performing communication between the plurality of devices is provided in each of the devices. As a result of the communication control function unit 400 being provided, communication can be performed even if various networks, devices, and the like exist between the devices constituting the OLT. Also, as described above, the functional unit encapsulates signal information into a secure packet and performs priority control, retransmission control, and destination control, for example. Note that not all of the priority control, the retransmission control, and the destination control need to be always executed.

As described above, in a case where a plurality of components corresponding to functions of the OLT are provided in a PON interface unit and a computing unit in a physically distributed manner, control signals need to be exchanged between the functional units. Particularly in a case where devices including the functional units are installed at places that are apart from each other, a risk of an erroneous connection may arise due to communication performed between the devices being mixed with another communication in the network, and risks of tampering, wiretapping, and the like may arise due to communication being performed via a network that is not secure. In contrast, the communication system 1 according to the above-described embodiment of the present invention includes the communication control function unit 400 that controls communication between the plurality of devices in the configuration in which functions constituting the OLT are provided in the plurality of devices in a distributed manner. Therefore, the communication system 1 can safely transfer signal information by encapsulating the signal information and can reliably transfer the signal information to a destination device by performing priority control or the like to keep the signal information from being disposed of.

Furthermore, owing to the above configuration, in the communication system 1 according to the present embodiment, the plurality of devices constituting the OLT need not be arranged adjacent to each other or need not be communicably connected directly to each other. Therefore, according to the present embodiment, the devices can be arranged at places that are apart from each other, and can be arranged more flexibly.

Note that in the above embodiment, a case is described as an example in which the communication system 1 is a communication system that realizes functions of an OLT in a PON system. However, devices (or systems) to which the present invention is applied are not limited to such a system, and the above-described communication system 1 can also be applied to an access device or a transfer device, for example.

At least a portion of the communication system 1 of the above-described embodiment may be realized by a computer 410, In such a case, a program for realizing the functions may be recorded on a computer-readable recording medium, and the functions may be realized by loading the program recorded on this recording medium to a computer system and executing the program. Note that the "computer system" used herein includes an OS and hardware such as peripheral devices. Also, the "computer-readable recording medium" refers to a portable medium such as a flexible disk, a magneto-optical disk, a ROM, or a CD-ROM, or a storage device built hi the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory hi a computer system that serves as a server or a client in that case. Also, the above-described program may be a program for realizing some of the aforementioned functions, a program that can realize the aforementioned functions in combination with a program that has already been recorded in the computer system, or a program that is realized using a programmable logic device such as a FPGA (Field Programmable Gate Array).

REFERENCE SIGNS LIST

1 Communication system
5 Communication system
10 PON interface
20a, 20b Server
40 Network
50 PON interface
60a, 60b Server
100 Hardware unit
101 Software unit
102 Device dependent app unit
200 OLT function management unit
201 Device independent app unit
400 Communication control function unit
401 Capsulation function unit
402 Priority/retransmission control function unit
403 Destination control function unit
500 Hardware unit
501 Software unit
502 Device dependent app unit
600 OLT function management unit
601 Device independent app unit

The invention claimed is:

1. A communication device in a communication system in which functions that are converted to software are configured as a plurality of components, and the functions are realized as a result of the components being respectively executed by a plurality of communication devices that are connected to a network wherein the functions include computer program instructions, the communication device comprising:
a processor; and
a storage medium having the computer program instructions stored thereon, when executed by the processor, perform to:
encapsulate information that is to be transmitted to another communication device;

wherein the plurality of communication devices includes a PON interface device and at least one server device:
the PON interface device includes:
a hardware unit that is hardware that realizes a PON interface; and
wherein the computer program instructions, when executed by the processor further forms a software unit having a device dependent component execution unit configured to execute a first component of the plurality of components, the first component realizing the PON interface and having a configuration that is dependent on a first standard of the hardware unit; and
the server device includes a device independent component execution unit configured to execute a second component of the plurality of components, the second component realizing the PON interface and having a configuration that is not dependent on the first standard of the hardware unit, wherein the configuration includes a general-purpose interface dependent on a second standard that is compatible with the hardware unit and a different hardware unit.

2. The communication device according to claim 1, wherein the computer program instructions further perform to control the degree of priority of transmission of the information to be transmitted to the other communication device.

3. The communication device according to claim 1, wherein the computer program instructions further perform to request another communication device to retransmit information if the information transmitted from the other communication device is disposed of.

4. The communication device according to claim 1, wherein the computer program instructions further perform to control such that the information is transmitted to the other communication device that is the destination of the information.

5. The communication device according to claim 1, wherein the computer program instructions further perform to acquire only information of which the destination is the communication device by disposing of information of which the destination is not the communication device.

6. The communication device according to claim 1, wherein the computer program instructions further perform to encrypt the information to be transmitted to the other communication device and a corresponding device authentication function unit configured to perform authentication of the other communication device that is the destination of the information.

7. A communication method to be executed with a communication system in which functions that are converted to software are configured as a plurality of components, and the functions are realized as a result of the components being respectively executed by a plurality of communication devices that are connected to a network, the communication method comprising
encapsulating information that is to be transmitted to another communication device;
wherein the plurality of communication devices includes a PON interface device and at least one server device,
the PON interface device includes:
a hardware unit that is hardware that realizes a PON interface, and
wherein the computer program instructions, when executed by the processor further perform:
a software unit having a device dependent component execution unit configured to execute a first component of the plurality of components, the component realizing the PON interface and having a configuration that is dependent on a first standard of the hardware unit; and
the server device includes a device independent component execution unit configured to execute a second component of the plurality of components, the second component realizing the PON interface and having a configuration that is not dependent on the first standard of the hardware unit, wherein the configuration includes a general-purpose interface dependent on a second standard that is compatible with the hardware unit and a different hardware unit.

* * * * *